T. R. HELLGREN.
CENTERING AND SQUARING CHUCK.
APPLICATION FILED AUG. 28, 1916.
1,268,458.
Patented June 4, 1918.
4 SHEETS—SHEET 3.
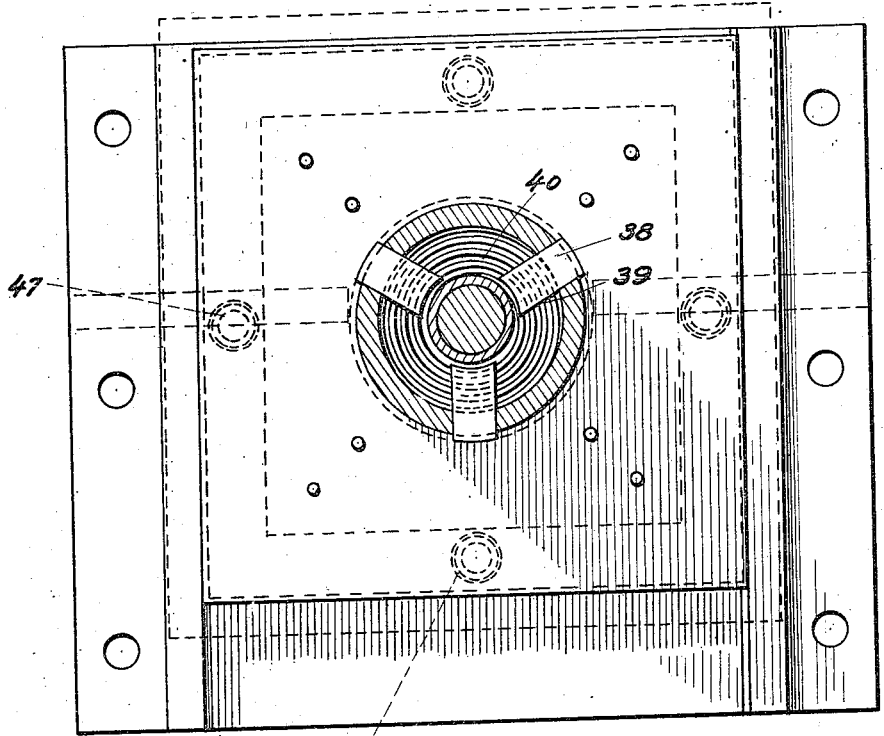
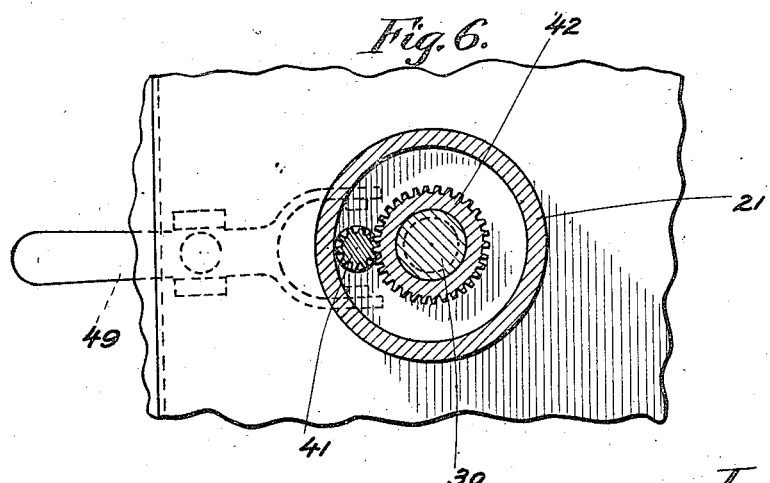

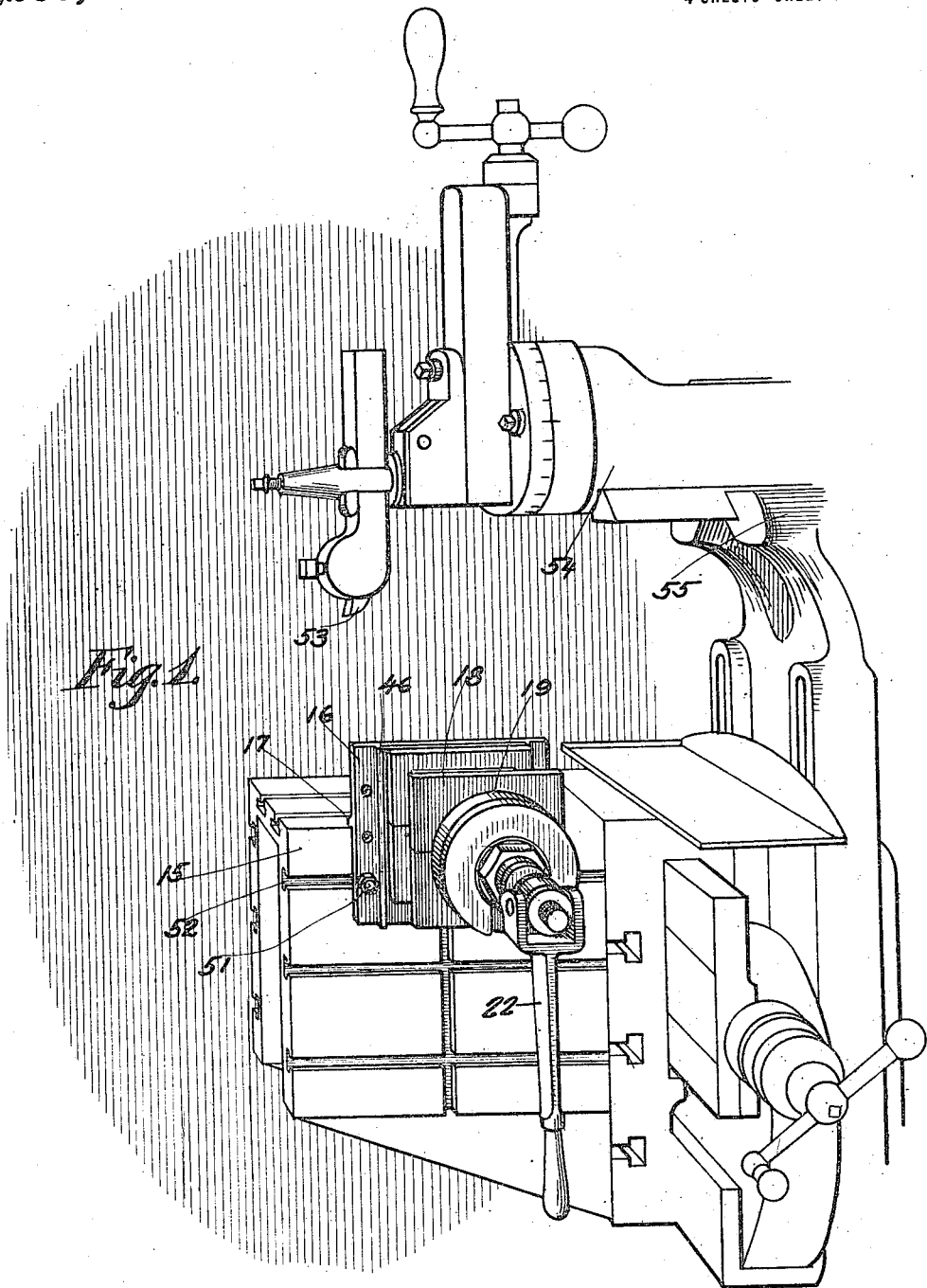

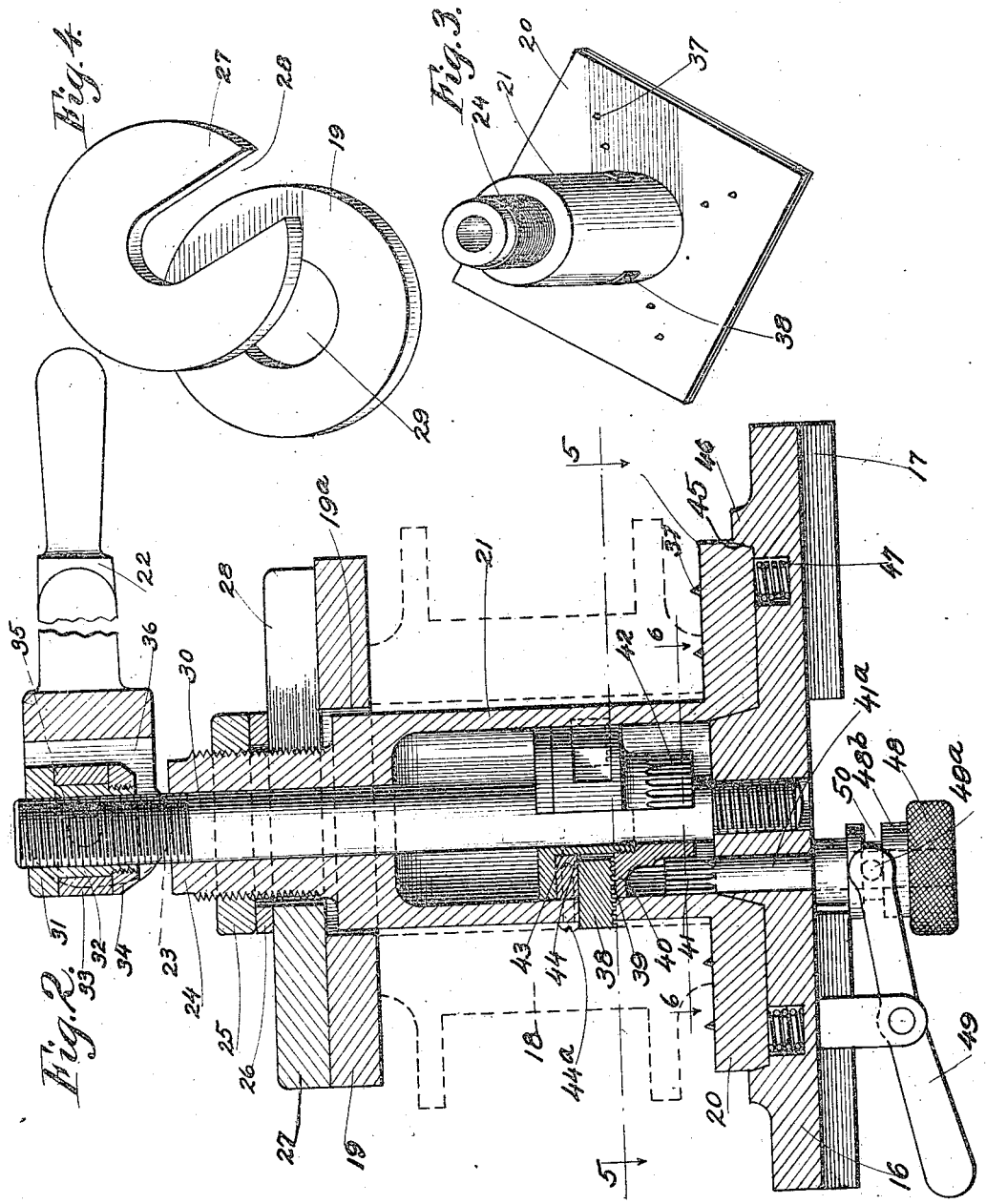

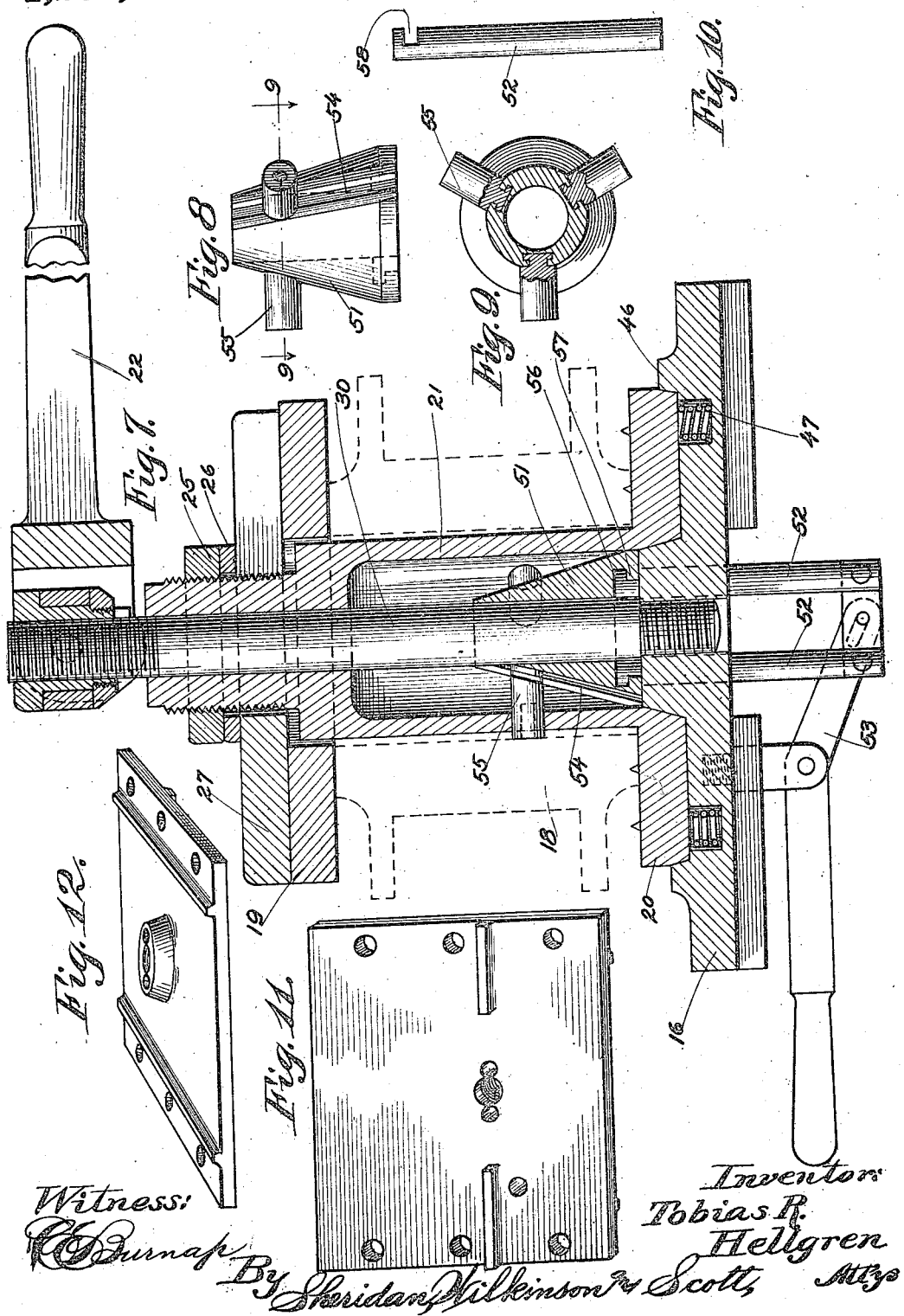

UNITED STATES PATENT OFFICE.

TOBIAS R. HELLGREN, OF AURORA, ILLINOIS.

CENTERING AND SQUARING CHUCK.

1,268,458.  Specification of Letters Patent.  Patented June 4, 1918.

Application filed August 28, 1916. Serial No. 117,316.

*To all whom it may concern:*

Be it known that I, TOBIAS R. HELLGREN, a citizen of the United States, residing at Aurora, in the county of Kane and State of Illinois, have invented certain new and useful Improvements in Centering and Squaring Chucks, of which the following is a specification.

My invention relates to chucks for planing brasses of connecting rods for steam engines and other machinery or prismatic machine parts of any character. It has for its object the providing of a centering and squaring or indexing chuck which insures the greatest accuracy in machining the brasses, with the minimum of time required in chucking and indexing. In railroad shops, also it is frequently necessary to machine and true up worn brasses, and it is very desirable to have means for quickly and accurately doing it.

My invention comprises a chuck which can be secured to the table of a shaper or a planer, or other machine tool, and in which a simple movement first properly centers the brasses in the chuck, after which a lever may be operated to clamp the brasses in correct relation to the stroke of the tool. After one side has been planed the lever may be operated to release the chuck to permit its ready rotation to its next position, with another side parallel to the stroke of the tool. In this manner all four sides may be machined with no loss of time in indexing, further than the simple movement of a lever and the rotation of the brasses and holding members of the chuck.

The lever is so arranged that by placing it in alinement with the axis of the chuck the clamping parts thereof as well as the work may be readily removed.

Other objects and advantages of my improved chuck will become apparent in the following specification when taken in connection with the accompanying drawings, in which:—

Figure 1 is a perspective view of my improved chuck shown applied to the table of a shaper, portions of the shaper being illustrated.

Fig. 2 is a sectional view through the axis of the chuck.

Fig. 3 is a perspective view of the center post or main element of the rotatable portion of the chuck.

Fig. 4 is a perspective view of two of the clamping elements.

Fig. 5 is a sectional view taken on the line 5—5 of Fig. 2.

Fig. 6 is a fragmentary sectional view taken on the line 6—6 of Fig. 2.

Fig. 7 is a sectional view of a form of my device having a modification in the centering mechanism.

Fig. 8 is a side elevation of a portion of the centering mechanism.

Fig. 9 is a sectional view taken on the line 9—9 of Fig. 8.

Fig. 10 is a detail of one of the actuating pins in the said centering mechanism.

Fig. 11 is a perspective view of the base of the chuck.

Fig. 12 is a perspective view of said base inverted.

In Fig. 1 the device is shown attached to the shaper table 15, the base 16 of the chuck being provided with a lip or flange 17 adapted to rest upon the upper surface of the table. Clamping bolts 51 may be used to secure the said base to the table, said bolts being inserted in one of the T-slots 52. The base, or support, 16 carries the elements of my chuck which are adapted to hold the brasses 18 in a convenient position for machining with the usual tool 53 carried by the ram 54. Said ram 54 has the usual horizontal reciprocating movement common to shapers. The shaper's structure forms no part of my invention but is illustrated to make the use of my chuck clear. The chuck can also be applied to planers and other machines, in a manner which will be obvious and which does not require a detailed description.

The brasses 18 are placed between the ring 19 and the base flange 20 around the center post 21. The brasses 18 are clamped between said ring 19 and flange 20 by screwing the nut 25 downwardly on the threaded upper portion of the post. The washer 27, open at 28 on one side, acts as a blocking device for permitting quick removal and insertion of the brasses and for permitting brasses of different sizes to be placed in the chuck. One or more small rings 26 may be placed between the nut 25 and the washer 27.

After the brasses have been clamped in the position above described, they may be indexed and held in the proper relation to the cutting tool by the following mechanism: The base flange 20 of the center post is squared and adapted to fit between ribs 46 on the main base plate 16. The base flange 20 is slightly beveled at its edges, as shown at 45, to fit upon corresponding bevel in the ribs 46. The center pin 30 is secured to the supporting plate 16 and extends to the upper or outer portion of the device where it carries a pivoted lever 22. This lever is pivotally mounted at 35 to a swivel ring 33, which is fitted to a sleeve 32 threaded to the pin 30. The flange 31 and nut 34 retain the sleeve in place. The lever 22 is provided with cam surfaces 23 which bear upon the upper end of the post 21 when the lever is in a right angular position as shown in Fig. 2 and force the beveled base flange 20 into the main support base 16. When thus clamped in said position, it is obvious that the base flange 20 and the brasses which are secured to it are rigidly held in the desired relation to the stroke of the cutting tool. When thus clamped one of the four sides of the brasses may be planed or finished. It is obvious that the square form of the base flange 20 permits indexing to four positions and that the four sides of the brasses may be brought into the desired relation to the cutting tool for planing. This indexing may be accomplished by moving the lever 22 to a position in alinement with the pin 30, whereupon the post 21 on the flange 20, with the brasses attached, may be withdrawn from between the ribs 46 and rotated to a new position. Springs 47, in sockets in the supporting plate 16, automatically push the flange from between the ribs. The lever 22 will naturally fall to a pendant position and will clamp the chuck in its new position. It will be seen that by locating and arranging the lever 22 as shown in Fig. 1, gravity will operate to hold the same in locking position and thereby prevent accidental unlocking of the work during planing thereof.

In order to center the brasses about the post 21, so that the finished surfaces may all be uniformly finished at the desired distance from the axis of the bore, I have provided the following mechanism.

Three radially disposed pins or bars 38 are fitted to the apertures in the walls of the center post 21, and bear upon the bore of the brasses when pushed outwardly. They may be moved in a radial direction by a scroll-gear 40, which meshes with properly fitted teeth 39 on the lower side of the pins 38. The rotation of the scroll-gear 40 will obviously force the pins 38 outwardly or draw them inwardly depending upon the direction of rotation. The hub of the scroll-gear 40 is provided with spur gear teeth 42 which mesh with and are driven by the teeth of the small spur pinion 41. This small pinion is preferably integral with a knurled head 48 which the operator may rotate by hand when it is desired to adjust the pins 38.

The stem 41$^a$ of the pinion 41, is provided with a grooved collar 48$^b$, in the groove 50 of which bear the pins 49$^a$ of the small lever 49. By means of this small lever, the pinion 41 may be withdrawn from engagement with the gear 42. The indexing movement may then be performed without destroying the centering adjustment. The scroll gear 40 is held in proper relation to the pins 38 by a flanged sleeve 43, which is threaded to said gear. A suitable block or ring 44 for retaining the pins in place may be provided, said ring being fixed to the post 21, by screws 44$^a$. The centering mechanism above described is operated before the brasses are clamped between the circular plate 19 and the base flange 20. When said clamping is effected, the small pointed lugs 37 engage the brasses at one end and assist in holding them in position.

In the form shown in Figs. 7, 8, 9, 10, 11, and 12, the centering device differs from that above described. In this form a conical member 51 is provided which may be pushed vertically on the center pin 30 by small pins or rods, 52, slidably attached to the lever 53. The conical member 51 is provided with T-slots 54, which engage the T-shaped ends of the pins 55. These pins are three in number, preferably, and are radially disposed in the post 21. An upward movement imparted to the conical member 51 by the lever 53, will obviously push the pins 55 outwardly until they engage the bore of the brasses. The brasses are obviously centered by bearing upon the outer ends of the three pins 55.

In this form, the rotation of the chuck and indexing is permitted by the circular groove 56, which is provided with a flange 57 engaging notches 58 in the pins 52.

In order to facilitate the indexing, or to permit rotation immediately upon the operation of the lever 22, small springs 47 are provided in both forms of the device for pushing the flange 20 out of the main supporting base 16. It will be seen that said flange and the rotatable part of the chuck, together with the brasses it may carry can then be immediately rotated to a new position. It will be unnecessary for the operator to withdraw it from between the ribs 46.

The use and operation of my improved chuck has been already largely referred to in the above description, but I will briefly add the following:

When clamping brasses in the chuck, it will be necessary, of course, to place them around the post 21 and center them by rotating the head 48 or operating the lever 53, depending on which form of centering device is used. After thus centering the brasses about the post 21, one or more open washers 27 may be inserted between the nut 25 and the circular plate 19. More than one plate 19 may also be used in some cases. By rotating the nut 25, the brasses will be firmly clamped between the circular plate 19 and the base flange 20. The base flange 20 will then be placed between the ribs 46, whereupon the brasses will be properly indexed at once with reference to the stroke of the tool. It is, of course, obvious that in first clamping the brasses in position, they must be placed with one side parallel to the stroke of the tool. The planing on the other three sides may then be performed in succession, the indexing for each side being performed by first moving the lever 22 into alinement with the center pin 30, after which the brasses may be quickly rotated to a new position and clamped in said position by dropping the lever 22 to its right angular position. To remove the brasses, it is necessary only to loosen the nut 25 sufficiently to permit withdrawal of the open washer 27, when the brasses will be free to be removed. The hole in the plate 19 is large enough to pass over the nut 25 and the lever 22.

While I have described my invention more or less precisely as regards the detail of this construction, I do not wish to be limited thereto unduly as I contemplate changes in the form, proportion of parts, and the substitution of equivalents within the scope of the appended claims.

What I claim is:

1. In a device of the character described, a rotary work-holding member having a polygonal positioning element, a supporting member engageable with said element and preventing rotation of said holding member when in engagement therewith, and means having a single movement under the control of the operator for moving one of said members from unlocked to locked position with relation to the other.

2. In a device of the character described, a rotary work-holding member, having a polygonal positioning element, a supporting member engageable with said element and preventing rotation of said holding member when in engagement therewith, means having a single movement under the control of the operator for moving one of said members from unlocked to locked position with relation to the other, and automatic means for disengaging said members when unlocked to permit rotation of said holding member to new positions.

3. In a device of the character described, a rotary work-holding member, having a polygonal positioning element, a supporting member engageable with said element and preventing rotation of said holding member when in engagement therewith, means having a single movement under the control of the operator for locking said members in engagement, automatic means for disengaging said members when unlocked to permit rotation of said holding-member to new positions, means for centering said work about the axis of rotation of said holding-member before said work is clamped thereon, means for clamping work rigidly in place after centering, and blocking means between said clamping means and said work removable upon the loosening of said clamping means.

4. In a device of the character described, a rotary work-holding member, having a polygonal positioning element, a supporting member engageable with said element and preventing rotation of said holding member when in engagement therewith, means having a single movement under the control of the operator for locking said members in engagement, automatic means for disengaging said members when unlocked to permit rotation of said holding member to new positions, means for centering said work about the axis of rotation of said holding member before said work is clamped thereon, a clamping nut threaded to a reduced portion of said holding means, and a ring encircling said holding means and transmitting the pressure of said nut to the work, and having an aperture permitting its removal over said nut.

5. In a device of the character described, a rotary work-holding member, having a polygonal positioning element, a supporting member engageable with said element and preventing rotation of said holding member when in engagement therewith, means having a single movement under the control of the operator for locking said members in engagement, automatic means for disengaging said members when unlocked to permit rotation of said holding member to new positions, means for centering said work about the axis of rotation of said holding member before said work is clamped thereon, a clamping nut threaded to a reduced portion of said holding means, a ring encircling said holding means and transmitting the pressure of said nut to the work and having an aperture permitting its removal over said nut, and a blocking element open on one side and transmitting pressure from said nut to said ring.

6. In a device of the character described, a rotary work-holding member, having a polygonal positioning element, a supporting member engageable with said element and preventing rotation of said holding member when in engagement therewith, means having a single movement under the control of the operator for locking said members in engagement, automatic means for disengaging said members when unlocked to permit rotation of said holding member to new positions, means for centering said work about the axis of rotation of said holding member before said work is clamped thereon, a clamping nut threaded to a reduced portion of said holding means, a ring encircling said holding means and transmitting the pressure of said nut to the work and having an aperture permitting its removal over said nut, and a blocking element open on one side and transmitting pressure from said nut to said ring, said locking means comprising a clamping lever movable to a position in alinement with the axis of said holding member and permitting said ring to be removed over said lever.

7. In a device of the character described, a rotary work-holding member having a polygonal positioning element, a supporting member engageable with said element to prevent rotation of said holding member, a center pin carried by said supporting member upon which said holding member is rotatably and slidably mounted, a lever pivotally attached to said pin and bearing upon said holding member when in operative position to maintain engagement of said holding and supporting members, and means for disengaging said members when said lever is moved to its inoperative position.

8. In a device of the character described, a rotary work-holding member having a polygonal positioning element, a supporting member engageable with said element to prevent rotation of said holding member, a center pin carried by said supporting member upon which said holding member is rotatably and slidably mounted, a lever pivotally attached to said pin and bearing upon said holding member when in operative position to maintain engagement of said holding and supporting members, means for disengaging said members when said lever is moved to its inoperative position, said holding member having a reduced threaded portion to receive a clamping nut, and blocking means between said nut and the work having an aperture permitting it to be removed over said nut and said lever.

9. In a device of the character described, a rotary work-holding member having a polygonal positioning element, a supporting member engageable with said element to prevent rotation of said holding member, and means held by gravity in locking position operable to move one of said members into locking engagement with the other.

10. In a device of the character described, a rotary work-holding member having a polygonal positioning element, a supporting member engageable with said element to prevent rotation of said holding member, said holding member being rotatably and slidably attached to said supporting member, and means pivotally attached to said supporting member and held by gravity in position to lock said members in engagement.

11. In a device of the character described, a rotary work-holding member having a polygonal positioning element, a supporting member engageable with said element to prevent rotation of said holding member, said holding member being rotatably and slidably attached to said supporting member, means pivotally attached to said supporting member and held by gravity in position to lock said members in engagement, and means for disengaging said members when said last-named means is raised from its locking position.

12. In a device of the character described, a rotary work-holding member having a polygonal positioning element, a supporting member engageable with said element to prevent rotation of said holding member, means held by gravity in position to lock said members in engagement, and means for disengaging said members when said last-named means is raised from its locking position.

In testimony whereof, I have subscribed my name.

TOBIAS R. HELLGREN.

Witnesses:
J. A. CARNEY,
W. W. KOERFER.

Copies of this patent may be obtained for five cents each, by addressing the "Commissioner of Patents, Washington, D. C."